US006880035B1

United States Patent
Groeger et al.

(10) Patent No.: US 6,880,035 B1
(45) Date of Patent: Apr. 12, 2005

(54) ELECTRONIC BUS CONTROL DEVICE WITH A PARALLEL DATABUS AND A METHOD FOR THE OPERATION OF THE BUS CONTROL DEVICE

(75) Inventors: Hans-Detlef Groeger, Poing (DE); Robert Baumgartner, Wörth (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/807,522

(22) PCT Filed: Oct. 12, 1999

(86) PCT No.: PCT/EP99/07631
§ 371 (c)(1),
(2), (4) Date: Apr. 12, 2001

(87) PCT Pub. No.: WO00/22537
PCT Pub. Date: Apr. 20, 2000

(30) Foreign Application Priority Data

Oct. 12, 1998 (DE) .......................................... 198 46 913

(51) Int. Cl.⁷ ............................................... G06F 13/00
(52) U.S. Cl. .......................... 710/308; 710/310; 710/22; 710/27; 710/231; 710/232
(58) Field of Search ................................ 710/305–306, 710/308–315, 22–28, 31–35; 709/208–216

(56) References Cited

U.S. PATENT DOCUMENTS

| 4,930,069 | A | * | 5/1990 | Batra et al. .................... 710/22 |
| 5,072,374 | A | * | 12/1991 | Sexton et al. .................. 710/22 |
| 5,241,628 | A | * | 8/1993 | Solari .......................... 710/308 |
| 5,828,856 | A | * | 10/1998 | Bowes et al. ................. 710/308 |
| 5,941,968 | A | * | 8/1999 | Mergard et al. ............. 710/308 |
| 6,012,120 | A | * | 1/2000 | Duncan et al. ............... 710/308 |
| 6,047,337 | A | * | 4/2000 | Smith .......................... 710/23 |
| 6,055,584 | A | * | 4/2000 | Bridges et al. ............... 710/27 |
| 6,119,176 | A | * | 9/2000 | Maruyama .................... 710/25 |
| 6,341,328 | B1 | * | 1/2002 | Heer ............................ 711/112 |
| 6,412,027 | B1 | * | 6/2002 | Amrany et al. ............... 710/22 |
| 6,453,368 | B2 | * | 9/2002 | Yamamoto .................... 710/27 |
| 6,546,019 | B1 | * | 4/2003 | Kato et al. ................... 370/447 |

* cited by examiner

Primary Examiner—Paul R. Myers
Assistant Examiner—Raymond N Phan
(74) Attorney, Agent, or Firm—Schiff Hardin LLP

(57) ABSTRACT

An electronic control device with a parallel databus and a plurality of assemblies connected to the databus. The assemblies each include a processor and a memory device and are connected to the databus with a bus controller. The data are transmitted between a transmitter assembly and a receiver assembly with messages. The data bus essentially corresponds to the MULTIBUS II. The bus controller of the transmitter assembly is fashioned such that, without making use of the processor of the transmitter assembly, it reads data stored in the memory device of the transmitter assembly in response to a request message of the receiver assembly and sends them to the receiver assembly.

13 Claims, 4 Drawing Sheets

| D<31..24> | D<23..16> | D<15..8> | D<7..0> |
|---|---|---|---|
| Reserved | Type=02 | Source_addr. | Dest_addr. |
| data addr. in I/O-CPU ||||
| Duty Cycle | No. data bytes |||

| Data | Data | Data | Data |
|---|---|---|---|
| byte 31 | byte 30 | byte 29 | byte 28 |

FIG.5

| D<31..24> | D<23..16> | D<15..8> | D<7..0> |
|---|---|---|---|
| | | Source_addr. | Dest_addr. |
| | | | Type=3CH,3DH |
| Data | Data | Data | Data |
| byte 3 | byte 2 | byte 1 | byte 0 |

| Data | Data | Data | Data |
|---|---|---|---|
| byte 31 | byte 30 | byte 29 | byte 28 |

FIG.6

| | Byte 3 | Byte 2 | Byte 1 | Byte 0 |
|---|---|---|---|---|
| 1 | | Duty Cycle | Source addr. | Destination addr. |
| 2 | DMA addr. ||||
| 3 | Byte Count ||||

FIG.7

ELECTRONIC BUS CONTROL DEVICE WITH A PARALLEL DATABUS AND A METHOD FOR THE OPERATION OF THE BUS CONTROL DEVICE

BACKGROUND OF THE INVENTION

1. Field of the Invention

The present invention is directed to a control device with a parallel databus and to a method for the operation of the control device.

The invention is particularly directed to an electronic control device that must process a large data stream such as, for example, a control device for editing print data for a high-performance printer.

2. Description of the Related Art

A control device called an "SRA controller" (SRA: Scalable Raster Architecture) is described in the publication "Das Druckbuch—Technik und Technologie der Hochleistungsdrucker von Océ Printing Systems GmbH—Drucktechnologien", Edition 3c, May 1998, ISBN 3-00-001019-X.

The structure of this known control device is schematically shown in FIG. 1. Such a control device 1 comprises an I/O module 2, one or more raster modules 3 and a serializer module 4. The individual modules 2 through 4 are connected to one another via a parallel databus 5. The raster modules 3 and the serializer module 4 are connected to one another via a further pixel bus 6. A high-performance printer 7 is connected to the serializer module 4.

The I/O module receives the print information from a computer device that can be a large computer system or a computer network as well. The print information is forwarded from the I/O module 2 to the raster modules 3 and the serializer module 4, whereby the raster modules 3 receive the print image information and convert it into a print image data stream that can be processed by the high-performance printer 7. These print image data streams are transmitted from the raster modules 3 via the pixel bus 6 to the serializer module 4, which forwards the data streams queued in a specific sequence and to the high-performance printer 7.

For example, the databus is a Multibus II (Multibus is a registered trademark of Intel Corp.). The Multibus II is a synchronized bus that is defined in IEEE Standard for a High-Performance Synchronous 32-Bit Bus: MULTIBUS II, The Institute of Electrical and Electronics Engineers, Inc., 345 East 47th Street, NY 10017, USA, 1988. Below, the "MULTIBUS II" is simply referred to as "multibus".

The modules 2 through 4 of the control device 1 are respectively provided with a processor. An inter-processor communication ensues with a message transfer given systems based on the multibus, whereby messages with data packets having a predetermined length are communicated for the transfer of data.

There are two kinds of these messages given the multibus, namely what are referred to as unsolicited messages and solicited messages. The unsolicited messages can be view as "intelligent interrupts", whereby up to 255 interrupt sources (the number of valid addresses) can send an unsolicited message. 28 bytes of status information can be transmitted with an unsolicited message.

The properties of an unsolicited message are that their arrival cannot be predicted by the receiver, whereby the transmission modalities (transmission rate, data quantity, . . . ) are first negotiated with unsolicited messages (buffer request message, buffer grant message and buffer reject message).

A data transfer from the I/O module 2 to the raster modules 3 via the databus 5 is shown in a flowchart in FIG. 2. The actions that occur at the I/O module are thereby shown at the left side, and the actions that are executed at the raster module 3 are shown at the right side.

In step S1, the I/O module 2 sends a message to the raster module 3 that data are present. This message is generated by the processor of the 110 module. In response thereto, the raster module sends a corresponding message in step S2 if it needs data. This message is triggered by the processor of the raster module 2. When the I/O module 2 has received this message, the processor programs a DMA controller of the I/O module to send the requested data to the raster module and sends a buffer request message to the raster module (step S3). When the raster module can accept these data, its processor programs a DMA controller for the reception of the data and sends a buffer grant message to the I/O module (step S4).

The "negotiations " are ended with the reception of the buffer grant message by the I/O module, and the I/O module sends a data message containing a data packet to the raster module (step S5). Such a data message is transmitted until all data have been communicated to the raster module, whereby this is checked in a step S6.

When all data have been sent to the raster module, then the data transfer is ended (S7).

The steps S2 through S6 form a solicited message (broken-line frame), whereby the negotiation (S2 through S4) with which the data are requested is implemented with unsolicited messages. The individual messages of the steps S2 through S4 are respectively generated by the processors of the modules 2, 3.

The above-described interprocessor communication with a message transfer is described under the heading "Message Passing" in the publication by F. Mayer et al., "Message Passing-Protokolle in einem verteilten heterogenen Multibus-II-Mehrrechnersystem" Automatisierungstechnische Praxis—ATP DE, Oldenburg Verlag, Munich, Volume 37, No. 12, pages 42–44, 46–50, XP000542307, ISSN: 0178–2320.

Publish ed PCT Patent Application WO-A-91/06058 discloses a memory and data bank system for storing documents in the form of image data that comprises a memory processor unit connected to a databus that works according to the Multibus II protocol and, accordingly, implements the above-described method steps S1 through S7 in the data transfer. This memory processor unit is provided with an ADMA controller that, following the negotiation phase (steps S2 through S4), automatically implements the transmission of the messages (steps S5 and S6).

What are referred to as DMA controllers are known for controlling the read-in and output of memory signals. Their typical structure and functioning are described, for example, in the publication by Tietze, Schenk, "Halbleiter-Schaltungstechnik", Springer-Verlag (1985), pages 672–675. Typical applications and functions of DMA controllers are cited in the publication by Messmer, "PC-hardware", Addison-Wesley, 3rd Edition (1995), pages 515–516.

German Patent Document DE-T2-38 52 378 discloses a mechanism and a method for opposite flow control in a bus system, whereby the bus system is controlled with a bus administrator. In this known bus system, specific bus messages are employed in order to inform a process executing on a bus unit about a result or about an unanticipated input of another bus unit. The bus unit that receives the message knows immediately to where the message must be forwarded, instead of having to derive where the message is to be forwarded from the sender. The uninterrupted process need not return to the sender of the message in order to determine what is to be done. Since this message contains a report about what is to be done, little time is wasted determining the reason for sending the message.

A plurality of bus units can thus quickly addressed with this bus system and their processing status can be immediately modified.

SUMMARY OF THE INVENTION

The present invention provides a control device that comprises a parallel databus and a plurality of assemblies respectively provided with a processor that can communicate over the databus such that a large data stream can be more quickly and efficiently processed. The invention also provides a method for operating such a control device with which a large data stream can be simply and efficiently governed in the control device.

In particular, the invention provides an electronic control device with a parallel databus and a plurality of assemblies connected to the databus that respectively include a processor, a memory device and a DMA controller and that are connected to the databus with a bus controller, data is transmitted between a transmitter assembly and a receiver assembly with messages, the bus controller of the transmitter assembly is fashioned such that, in response to a request message of the receiver assembly, it programs the DMA controller to read out data stored in the memory device of the transmitter assembly and to send them to the receiver assembly, without making use of the processor of the transmitter assembly.

In a preferred embodiment, the DMA controller is integrated into the bus controller of the transmitter assembly. The databus of one example is a data bus compatible with the MULTIBUS II. The receiver assembly may be a fail-safe counter for monitoring the message transfer that is restarted upon reception of a data message.

The present invention also provides a method for operating an electronic device, where the electronic control device includes a parallel databus and a plurality of assemblies connected to the databus that are respectively provided with a processor and a memory device and are connected to the databus with a bus controller, whereby data are transmitted between a transmitter assembly and a receiver assembly with messages, and the receiver assembly initiates a data transfer by sending a request message to the transmitter module, and the bus controller of the transmitter assembly, without making use of the processor of the transmitter assembly, transmits data stored in the memory device of the transmitter assembly to the receiver assembly in response to the request message.

Preferably, a control device as set forth in the foregoing is employed. In one embodiment, following the reception of a request message, the bus controller of the transmitter assembly sends a plurality of data messages respectively containing a data packet to the receiver assembly. For example, information for programming a DMA controller arranged at the transmitter assembly for reading and sending the data stored in the memory device of the transmitter assembly are transmitted with the request message. A DMA controller arranged on the transmitter assembly may be programmed by the bus controller on the basis of data communicated with the request message, being program to read and transmit the data stored in the memory device of the transmitter assembly. The DMA controller arranged on the receiver assembly is programmed for the reception of the data with the transmission of the request message. In one embodiment, the data are transmitted with a plurality of messages that respectively contain a data packet. The transmitter assembly may include a buffer wherein an entry is provided for each assembly present in the control device, so that the parameters characterizing the data transfer are written into the respectively entry and stored during a data transfer and are erased after the conclusion of the data transfer. Specifically, upon reception of a request message, the bus controller of the transmitter assembly checks whether the entry of the buffer allocated to the assembly sending the request message is already written with data characterizing a data transfer in order to prevent two data transfers from being simultaneously initiated with the same receiver assembly.

The invention also provides a control device for editing print data for a high-performance printer, with the features set forth above whereby the transmitter assembly forms an I/O module and a plurality of receiver modules that respectively form a ras ter module are provided.

The inventive electronic control device is provided with a parallel databus and a plurality of assemblies connected to the databus that respectively comprise a processor and a memory device and are connected to the databus bus with a bus controller, whereby data are transmitted between a transmitter assembly a nd a receiver assembly with messages. The invention is characterized in that the bus controller of the transmitter assembly is fashioned such that, without making use of the processor of the transmitter assembly, it reads data stored in the memory device of the transmitter assembly in response to a request message of the receiver assembly and transmits them to the receiver assembly. The receiver assembly thus triggers an automatic transmission of the data at the transmitter assembly on the basis of its request message. This leads to a considerable unburdening of the transmitter assembly since the data can be directly read with a DMA controller significantly faster and more efficiently, and the processor is not occupied long by such a data transmission. Moreover, the initially described "negotiation", which comprises three message transmissions given the traditional multibus (see FIG. 2), is reduced to the transmission of a single request message, as a result whereof a further simplification and acceleration of the transmission procedure is achieved.

The method for the operation of such an electronic control device is characterized in that the receiver assembly initiates a data transfer by sending the request message to the transmitter assembly, and the bus controller of the transmitter assembly, without making use of the processor of the transmitter assembly, reads data stored in the memory device of the transmitter assembly in response to the request message and transmits them to the receiver assembly. As a result thereof, a large data stream can be quickly and efficiently transmitted from the transmitter assembly to the receiver assembly, so that the control device can govern a large data stream.

In a preferred embodiment of the invention, the data needed for programming a DMA controller arranged on the transmitter assembly are communicated from the receiver assembly to the transmitter assembly by means of the request message. With the request message, thus, the receiver assembly controls the data transmission from the transmitter assembly.

With the inventive method, the individual receiver assemblies can independently and simultaneously fetch the data they want from the transmitter assembly. As a result of the automatic processing of the request messages in the transmitter assembly, this can make the data available very fast. The simplification of the transmission protocol effects a further speed-up of the transmission procedure.

BRIEF DESCRIPTION OF THE DRAWINGS

The invention is explained in greater detail below on the basis of an exemplary embodiment shown in the drawings.

FIG. 5 shows the structure of a request message in a block circuit diagram;

FIG. 6 shows the structure of a data message in a block circuit diagram; and

FIG. 7 shows the structure of an entry in a buffer provided at the transmitter assembly in a block circuit diagram.

DETAILED DESCRIPTION OF THE PREFERRED EMBODIMENTS

Figure 1:
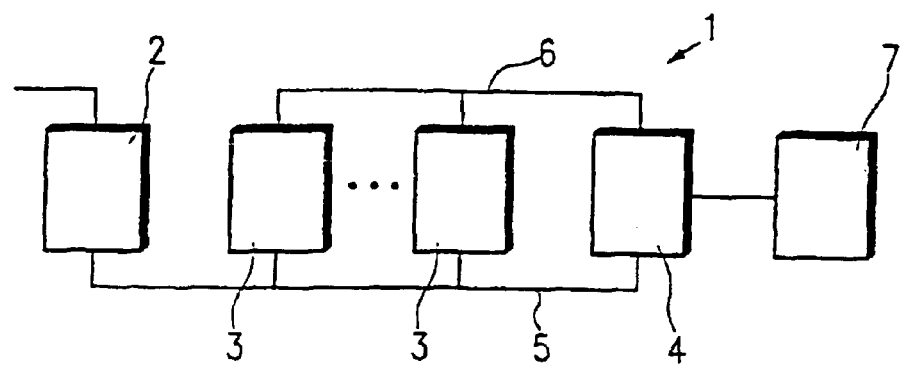
FIG. 1 shows the fundamental structure of a control device for editing print data for a high-performance printer in a block circuit diagram.

The present invention is explained on the basis of an exemplary embodiment of an electronic control device 1 for controlling a high-performance printer that has the same structure as the known control device shown in FIG. 1 and that is provided with an I/O module 2, one or more raster modules 3 and a serializer module 4. The individual modules 2 through 4 are connected to one another via a parallel databus 5. The raster modules 3 and the serializer module 4 are connected to one another via a further pixel bus 6. The high-performance printer 7 is connected to the serializer module 4.

The databus 5 is a development of the multibus and is essentially compatible therewith.

Figure 3:
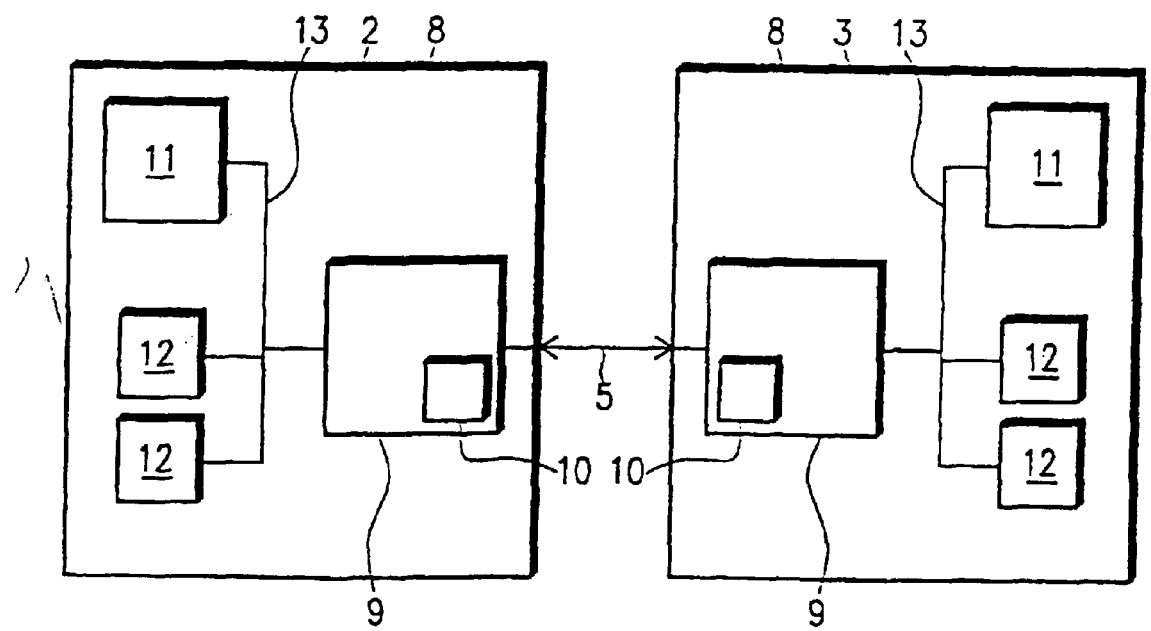
FIG. 3 is a block diagram showing two assemblies connected via a databus.

The modules 2 through 4 respectively represent an assembly 8 connected to the databus. Two such assemblies 8, namely the I/O module 2 and the raster module 3, are schematically shown in FIG. 3.

The assemblies 8 respectively comprise a bus controller 9 that are each provided with an internal DMA controller 10 integrated into the bus controller 9. The assemblies respectively have a processor 11 and memory devices 12 that are connected to one another and to the bus controller 9 with an internal computer bus 13. The assemblies 8 comprise further elements such as, for example, components and lines for further interfaces and the like that, however, are not shown in FIG. 3 for reasons of simplification.

Figure 4:
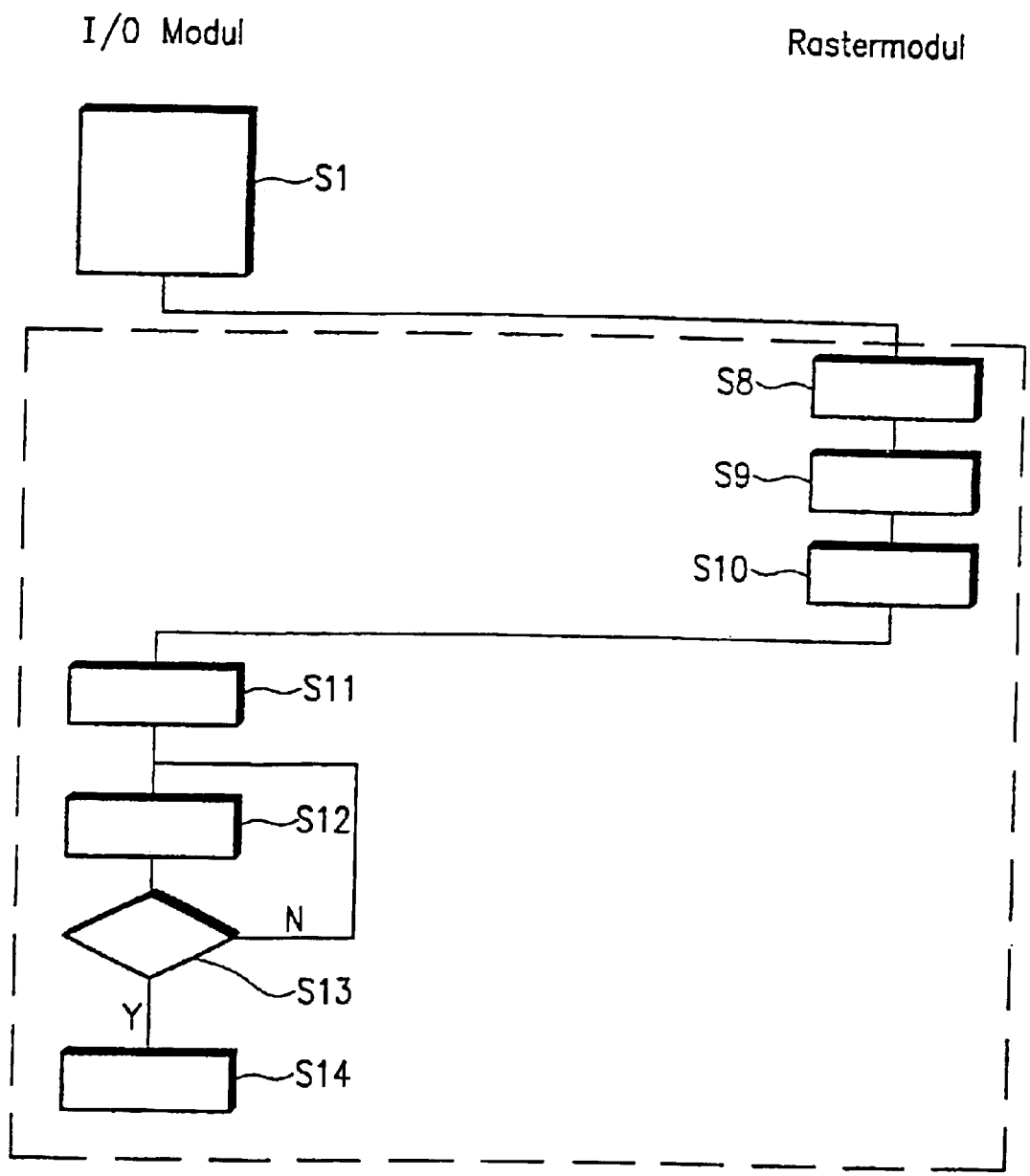
FIG. 4 shows the inventive data transfer in a flowchart.

The inventive, automatic requested message transfer is explained below on the basis of the flowchart shown in FIG. 4. The actions that occur at the I/O module 2 are thereby again shown at the left aside, and the actions that are implemented at the raster module 3 are shown at the right side.

Figure 2:
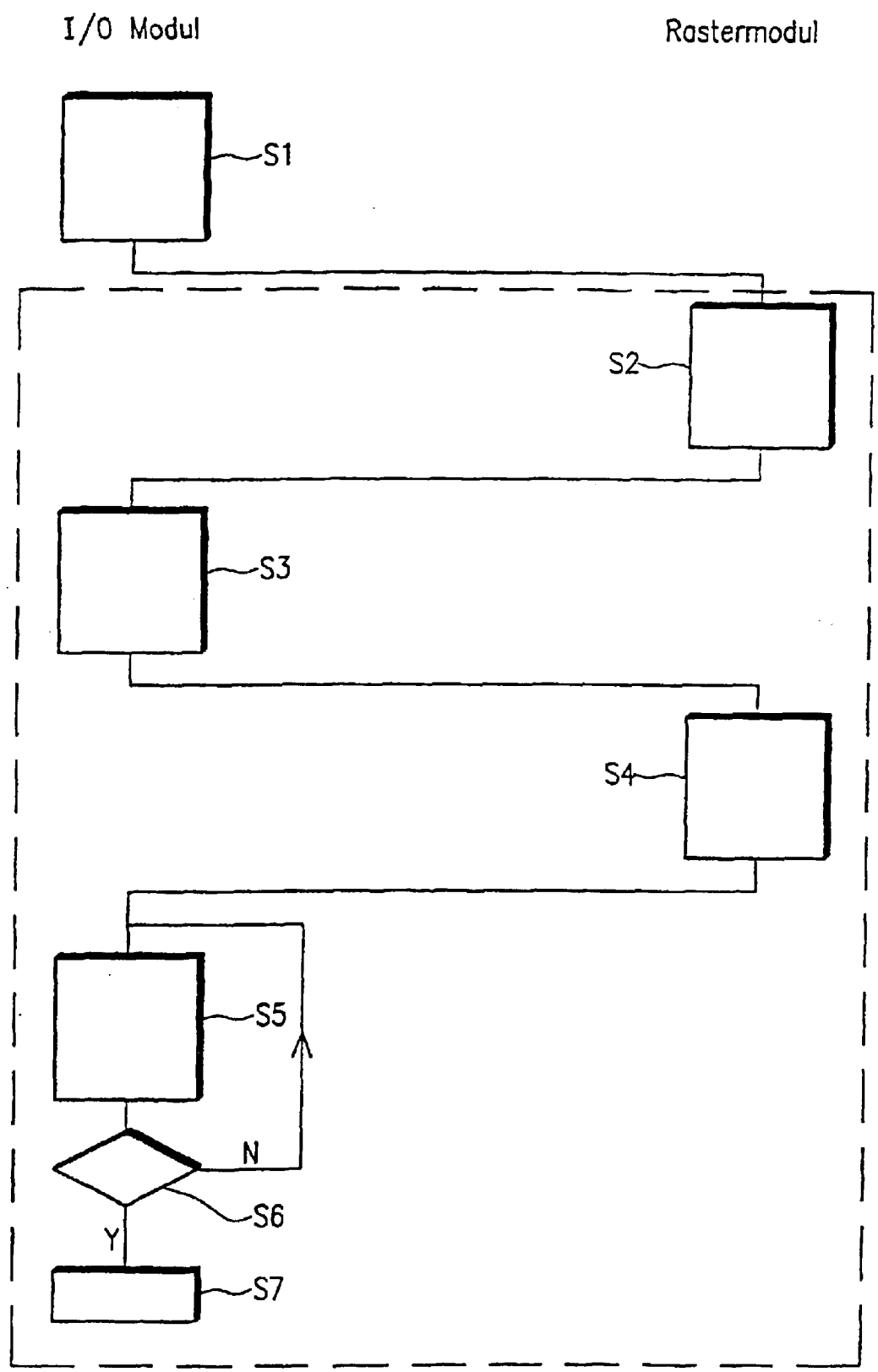
FIG. 2 is a flowchart of a data transfer according to a transmission method known from the multibus.

During the step S1, the I/O module 2 sends a message to a raster module 3 that data are present. This message is generated by the processor of the I/O module and corresponds to the step Si according to the known method shown in FIG. 2.

In response thereto, the raster module 3 checks in a step S8 whether it needs the data offered by the I/O module 2 and whether there is enough memory space for the acceptance of the data. This check is carried out by the processor 11 of the raster module 3.

When these data are not present, the processor 11—in a step S9—programs the DMA controller 10 in the bus controller 9 for the reception of a data packet and write a data request message into the bus controller 9. The data request message contains the address of the data in the memory of the I/o module 2, the plurality of data bytes that are to be transmitted, and what is referred to as a duty cycle for the transmission of the requested messages. The duty cycle defines the spacing in which the requested messages are sent via the data bus 5. Over and above this, further data can also be contained in the data request message that define the respective data transfer in greater detail. The structure of this data request message is shown in FIG. 5. The data request message represents an unsolicited message. The message type has the value 02H.

During the step S10, the bus controller 9 of the raster module 3 sends this data request message to the I/O module 2 via the databus 5.

Based on the criterion of the data (address of the data in the memory of the I/O module, plurality of data bytes, duty cycle, etc.) contained in the data request message, the bus controller 9 of the I/O module 2 programs its DMA controller 10 with the address and the number of bytes of a data message to be transmitted (step S11).

The structure of such a data message is shown in FIG. 6. A data message comprises a source address and a destination address, whereby the occupancy of the data request message is valid therefor, so that the source address is the address of the receiver assembly and the destination address is the address of the transmitter assembly. Two types of data message are provided, namely the type 3CH and the type 3DH, whose significance shall be explained later. A data packet with 32 bytes (byte 0 through byte 31) can be transmitted with the data message shown in FIG. 6.

For sending the data message shown in FIG. 6, the bus controller starts the DMA controller 10 in step S12 and packs the data communicated from the DMA controller 10 to the bus controller 9 into a data packet. The data packet is transmitted from the I/O module 2 to the raster module 3 with a data message via the databus 5.

A check is carried out in step S13 as to whether all data have already been transmitted. When further data have to be transmitted, then the program runs returns to the step S12, as a result whereof the next data message is transmitted. This procedure is repeated until all data have been transmitted in packets from the I/O module to the raster module. All of the data messages except the last data message that are thereby employed are of the type 3CH. The last data message is of the type 3DH. The data transfer has been ended with the transmission of all data packets (step S14). Due to the reception of the data message of the type 3DH, an interrupt is triggered at the raster module 3 that indicates to the processor of the raster module 3 that the requested data transfer has been ended. A message to the processor of the I/O module 2 only ensues when an error has occurred in the transmission of the data The steps S8 through S14 forms the automatic requested message transfer (broken-line frame). This automatically requested message transfer comprises only one unsolicited message, namely the data request message of the step S10, and the solicited data messages of the step S14. Compared to the solicited messages of the known multibus, the number of unsolicited messages is reduced from 3 th 1. A significant unburdening at the databus 5 is thereby achieved.

A defined data quantity of, for example, 4 KB is transmitted with such an automatic requested message transfer.

A buffer is provided in the bus controller 9 of the I/O module 2 wherein the parameters of the automatically requested message transfers can be deposited. One entry is provided in this buffer for each assembly 8 that can function as receiver assembly 3. In the present exemplary embodiment, the buffer comprises 21 entries. The parameters contained in the entries are (FIG. 7):
1. source and destination address for the automatic requested message transfer,
2. duty cycle for the data packets,
3. DMA address of the data in the memory device, and
4. plurality of data bytes.

Upon reception of a request message, the bus controller 9 of the I/O module can check whether the entry of the buffer allocated to the raster module 3 sending the request message is already described with data characterizing a data transfer. When the data of another automatically requested message transfer are already contained in the entry, an error message can be output and the request message can be rejected in order to prevent two message transfers from being simultaneously initiated with the same raster module.

The bus controller 9 sees to it that the request messages are processed in the sequence of their arrival. This assures that each raster module has a turn.

Given an occupied entry in the buffer or given an occupied input buffer wherein the arriving messages are intermediately stored, the request message is rejected with the error message NACK. The request message is subsequently repeated until it can either be processed or the number of repetitions defined in the protocol has been reached. When the data messages cannot be received by the raster module 3, the error NACk is also output and they are repeated until they can be accepted or until the defined plurality of repetitions has been reached.

When a raster module has initiated an automatic requested message transfer and sends further data request messages during its own transfer, then these messages are not transmitted. Instead, a transmit error is reported. Upon readout of the rejected unsolicited message from an error FIFO known by the multibus, a "no resource" bit is set.

When a DMA error occurs during the reception of the data at the raster module 3, then a corresponding status bit is set in the DMA controller 10 of the bus controller 9 and the DMA controller ends the transfer on its own. When no immediate actions are triggered at the processor as a result thereof, then the following executive sequence derives:

An internal buffer of the raster module 3 for the reception of the data messages fills up. The raster module therefore rejects further data messages. The bus controller of the I/O module repeats a rejected data message for a maximum of 127 times and then ends the data transfer on its own. The bus controller 9 of the I/O module subsequently reports the situation to its processor.

In addition, an internal fail-safe counter runs down at the raster module, this being always set to its start value by the reception of a data message. The rundown of the counter is communicated to the processor of the raster module, which subsequently implements an error recovery known from the multibus.

In a preferred embodiment of the invention for accelerating the above executive sequence at the side of the raster module (the fail-safe counter runs down in approximately 2 seconds), the processor of the raster module can already react to the DMA error in that it stops the DMA reception channel of the transfer and communicates the end of the transfer via an unsolicited message to the I/O module. The stopping ensues at the I/O module by an erase instruction output by the bus controller to erase the corresponding DMA reception channel.

When a DMA error occurs at the I/O module, the DMA channel is stopped by the internal executive sequencer—as in the case of an error at the raster module—and the corresponding status bits are set. Additionally, an unsolicited message is sent to the raster module, so that this stops the reception of the data message. Due to this message, the processor of the raster module forwards a stop instruction to the DMA controller and an erase instruction to the reception channel of the automatically requested message transfer. When the processor of the I/O module does not react to the DMA error, then the aforementioned fail-safe counter on the raster module runs down. Subsequently, the processor of the raster module must send an unsolicited message to the I/O module, so that the I/O module also ends the transfer.

The aforementioned fail-safe counter of the raster module is provided for the reception of the data messages and is restarted every time after the reception of a data message of the type 3CH. It runs down when no further data message is received within the time that has been set. In this case, the processor of the raster module stops the DMA channel in the bus controller and the reception channel of the automatically requested message transfer is erased. Additionally, an unsolicited message is sent to the I/O module so that the I/O module can stop the automatic requested message transfer. A stop instruction for the DMA channel of the I/o module is thereby not necessary since this is undertaken by the internal executive sequences of the bus controller.

A running, automatic requested message transfer at the raster module can be aborted with an erase instruction at the corresponding reception channel. The instruction takes immediate effect. All data messages arriving thereafter are rejected by the bus controller with an error message "transfer not understood" that is known from the multibus. The termination of the reception channel of the DMA controller must likewise be implemented by the processor.

A running, automatic requested message transfer is aborted or, respectively, arrested at the I/o module as a result of the following actions:
a) An error has occurred at the databus. All errors come into consideration:
   The repetition rate for a data message has reached the maximum value.
   a bus error, bus timeout or an agent error occurred in the transmission of the data message.
b) An error occurred in the DMA transmission. The following errors come into consideration:
   parity error
   page miss error
   fatal error given a transfer via the internal computer bus (PCI bus).
c) The processor aborts the running, automatic requested message transfer with a command.

In cases a) and b), the automatic, requested message transfer is aborted by the internal controller of the bus controller due to the error. The internal controller reports the cause of the error by setting an ASOMERR bit in a message status register. When a corresponding interrupt is enabled in a message control register, then an interrupt is additionally generated. The processor of the I/O module can determine the cause of the error by reading out an ASOM status register allocated to the automatic, requested message transfer. Before an automatic, requested message transfer can be resumed, the processor of the I/O module must output a corresponding command (ASOMGO).

The processor cannot abort an running, automatic requested message transfer at any time (see c). Dependent on the command employed, the automatic requested message transfer is still completely implemented or is immediately interrupted. It must be taken into consideration in the latter case that the raster module is waiting for the further arrival of data messages. A corresponding message is therefore sent from the I/O module to the raster module given an interruption of an automatically requested message transfer.

For logging the automatic requested message transfer, the following options can be established at the I/O module:
1. Each automatic requested message transfer is forwarded to the processor of the I/O module. Which assembly requested an automatic requested message transfer can thus be kept track of on the I/O module.
2. A register is provided in the bus controller that contains the message ID of the assembly requesting the automatic requested message transfer. This register is set to the message ID at the beginning of the transfer and is in turn reset at the end. The register can be read out at any time by the processor.

The invention has been set forth above on the basis of a control device for editing print data for a high-performance printer. The inventive control device is equally suited for any application wherein a large data stream must be processed. The I/O module, accordingly, can be considered in general as a transmitter assembly and the raster module can be considered as a receiver module, whereby the data are transmitted from the transmitter module to the receiver module.

In the above-described exemplary embodiment, a databus is employed that is essentially compatible with the multibus. The invention, however, is not limited to this type of databus but can be designed for any parallel databus that is suitable for a multi-processor architecture.

A DMA controller 10 integrated into the bus controller 9 is provided in the assemblies recited in the exemplary embodiment.

In the framework of the invention, of course, the DMA controller 10 can also be arranged outside the bus controller 9 on the assembly.

The above-described data messages respectively transmit a data packet of 32 bytes. The size of these data packets can be varied as needed and, for example, comprise 64 or 128 bytes. The data quantity transferred with an automatic requested message transfer can be fixed to any desired size of, for example, 4 KB, 8 KB, 16 KB or the like.

The invention can be summarized in brief in the following way:
It is directed to an electronic control device with a parallel databus and a plurality of assemblies connected to the databus. The assemblies respectively comprise a processor and a memory device and are connected to the databus with a bus controller. The data are transmitted between a transmitter assembly and a receiver assembly with messages. The data bus essentially corresponds to the MULTIBUS II.

The invention is characterized in that the bus controller of the transmitter assembly is fashioned such that, without making use of the processor of the transmitter assembly, it reads data stored in the memory device of the transmitter assembly in response to a request message of the receiver assembly and sends them to the receiver assembly.

As a result thereof, first, the processor of the transmitter assembly (I/O module) is relieved and, second, the communication between the transmitter assembly and the receiver assembly (raster module) can be significantly lowered and reduced to a single request message in the negotiation or, respectively, determination of the data transfer. The electronic control device is preferably fashioned for a control device for driving a high-performance printer.

Although other modifications and changes may be suggested by those skilled in the art, it is the intention of the inventors to embody within the patent warranted hereon all changes and modifications as reasonably and properly come within the scope of their contribution to the art.

We claim:
1. An electronic control device, comprising:
a parallel databus;
a plurality of assemblies connected to said parallel databus, said plurality of assemblies each including:
a processor,
a memory device;
a DMA controller;
a bus controller connecting said plurality of assemblies to said parallel databus such that data are transmitted between a transmitter assembly of said plurality of assemblies and a receiver assembly of said plurality of assemblies with messages, the bus controller of the transmitter assembly being fashioned such that the transmitter assembly programs the DMA controller to read out data stored in the memory device of the transmitter assembly and to send them to the receiver assembly in response to a request message of the receiver assembly without making use of the processor of the transmitter assembly.

2. An electronic control device according to claim 1, wherein the DMA controller is integrated into the bus controller of the transmitter assembly.

3. An electronic control device according to claim 1, wherein the databus is a data bus compatible with MULTIBUS II.

4. An electronic control device according to claim 1, wherein the receiver assembly includes a fail-safe counter for monitoring message transfer that is restarted upon reception of a data message.

5. A method for operating an electronic device, the electronic control device including a parallel databus and a plurality of assemblies connected to the databus that are respectively provided with a processor and a memory device and are connected to the databus with a bus controller, comprising the steps of:
transmitting data between a transmitter assembly and a receiver assembly with messages;
initiating a data transfer by sending a request message from the receiver assembly to the transmitter module;
transmitting data stored in the memory device of the transmitter assembly to the receiver assembly in response to the request message without making use of the processor of the transmitter assembly from the bus controller of the transmitter assembly; and
utilizing a control device having
a parallel databus;
a plurality of assemblies connected to said parallel databus, said plurality of assemblies each including:
a processor;
a memory device;
a DMA controller;
a bus controller connecting said plurality of assemblies to said parallel databus such that data are transmitted between a transmitter assembly of said plurality of assemblies and a receiver assembly of said plurality of assemblies with messages, the bus controller of the transmitter assembly being fashioned such that the transmitter assembly programs the DMA controller to read out data stored in the memory device of the transmitter assembly and to send them to the receiver assembly in response to a request message of the receiver assembly without making use of the processor of the transmitter assembly.

6. A method according to claim 5, further comprising the step of:

sending a plurality of data messages respectively containing a data packet to the receiver assembly from the bus controller of the transmitter assembly following reception of a request message.

7. A method according to claim 5, further comprising the step of:

transmitting information for programming a DMA controller arranged at the transmitter assembly for reading and sending the data stored in the memory device of the transmitter assembly with the request message.

8. A method according to claim 5, further comprising the step of:

programming a DMA controller arranged on the transmitter assembly by the bus controller on a basis of data communicated with the request message, being programmed to read and transmit the data stored in the memory device of the transmitter assembly.

9. A method according to claim 5, further comprising the steps of:

programming a DMA controller arranged on the receiver assembly for reception of the data with the transmission of the request message.

10. A method according to claim 5, further comprising the step of:

transmitting the data with a plurality of messages that respectively contain a data packet.

11. A method for operating an electronic device, the electronic control device including a parallel databus and a plurality of assemblies connected to the databus that are respectively provided with a processor and a memory device and are connected to the databus with a bus controller, comprising the steps of:

transmitting data between a transmitter assembly and a receiver assembly with messages;

initiating a data transfer by sending a request message from the receiver assembly to the transmitter module;

transmitting data stored in the memory device of the transmitter assembly to the receiver assembly in response to the request message without making use of the processor of the transmitter assembly from the bus controller of the transmitter assembly; and providing an entry in a buffer of the transmitter for each assembly present in the control device, so that the parameters characterizing the data transfer are written into the respectively entry and stored during a data transfer and are erased after the conclusion of the data transfer.

12. A method for operating an electronic device, the electronic control device including a parallel databus and a plurality of assemblies connected to the databus that are respectively provided with a processor and a memory device and are connected to the databus with a bus controller, comprising the steps of:

transmitting data between a transmitter assembly and a receiver assembly with messages;

initiating a data transfer by sending a request message from the receiver assembly to the transmitter module;

transmitting data stored in the memory device of the transmitter assembly to the receiver assembly in response to the request message without making use of the processor of the transmitter assembly from the bus controller of the transmitter assembly; and upon reception of a request message, checking by the bus controller of the transmitter assembly whether the entry of the buffer allocated to the assembly sending the request message is already written with data characterizing a data transfer in order to prevent two data transfers from being simultaneously initiated with the same receiver assembly.

13. A control device for editing print data for a high-performance printer, comprising;

a parallel databus;

a plurality of assemblies connected to said parallel databus, said plurality of assemblies each including:
a processor;
a memory device;
a DMA controller;

a bus controller connecting said plurality of assemblies to said parallel databus such that data are transmitted between a transmitter assembly of said plurality of assemblies and a receiver assembly of said plurality of assemblies with messages, the bus controller of the transmitter assembly being fashioned such that the transmitter assembly programs the DMA controller to read out data stored in the memory device of the transmitter assembly and to send them to the receiver assembly in response to a request message of the receiver assembly without making use of the processor of the transmitter assembly the transmitter assembly forming an I/O module and a plurality of receiver modules that respectively form a raster module.

* * * * *